United States Patent [19]

Beckmann et al.

[11] 4,103,544

[45] Aug. 1, 1978

[54] TURBINE ENGINE SURGE DETECTOR

[75] Inventors: Peter V. Beckmann, Lake Park; James B. Kelly, Lake Worth, both of Fla.

[73] Assignee: United Technologies Corporation, Hartford, Conn.

[21] Appl. No.: 825,871

[22] Filed: Aug. 18, 1977

[51] Int. Cl.² .......................................... G01M 15/00

[52] U.S. Cl. .................................. 73/115; 340/27 SS

[58] Field of Search ................... 73/115, 116, 407 PR; 60/39.28 R; 340/27 SS

[56] References Cited

U.S. PATENT DOCUMENTS 3,868,625 2/1975 Speigner et al. .................. 73/115 X

FOREIGN PATENT DOCUMENTS 473,267 10/1937 United Kingdom ...................... 73/116

*Primary Examiner*—Jerry W. Myracle
*Attorney, Agent, or Firm*—Norman Friedland

[57] ABSTRACT

A pair of pressure sensors having their openings in diametrically opposed positions are mounted in and substantially parallel to the flow stream in a turbine type power plant for obtaining a differential pressure signal indicative of an incipient surge condition. Logic circuitry selects a threshold value, whereupon the signal is utilized to provide an output signal for taking surge corrective action.

7 Claims, 3 Drawing Figures

TURBINE ENGINE SURGE DETECTOR

BACKGROUND OF THE INVENTION

This invention relates to turbine types of power plants and particularly to means for detecting incipient surge of the compressor.

As is well known in the jet engine art, surge is a problem that has plagued the industry since the utilization of axial flow compressors. While there are various theories on surge and the occurrence thereof, suffice it to say, that under certain conditions of engine operation flow separation along the blades can occur causing a pressure pulsation. Without corrective action, this pressure pulsation can be deleterious to the engine and in some cases destructive to the aircraft propelled by that engine. In certain engine applications, surge can be a bigger factor than in other applications and between engine models the surge characteristics are different. Additionally, even in a given engine model, surge may be caused by different factors and may occur at different points along the engines flight envelope.

As for example, U.S. Pat. application Ser. No. 762,763 filed by E. Preti and H. W. Ripy on Jan. 26, 1977 and assigned to the same assignee as this application discloses a surge detector where a single temperature sensor mounted at the compressor inlet detects incipient surge. However, in that application, the only portion of the flight envelope where that detector is operational is when the augmentor is being utilized. Hence, in other portions of the flight envelope, surge can occur without being detected.

Surge detection in the context of this application is the measurement of given parameters that are indications that surge is occurring. Obviously, once surge is detected it is abundantly important that corrective action is taken immediately to correct for the surge. The corrective action does not form a part of the invention, but any of the well-known means can be employed, such as compressor bleed, engine shutdown, engine geometry change and the like.

Additionally, surge detection should not be misunderstood for surge scheduling. Surge scheduling is generally manifested by the engine's fuel control which monitors certain engine parameters and adjusts fuel flow or other variable to operate it below the surge line. Notwithstanding this provision, surge can still occur by aircraft maneuvers, or change in engine characteristics over a duration of time and the like. Hence, surge detection is typically used in addition to the surge prevention scheduling means.

We have found that we can provide surge detection at virtually all occurrences in the engine operation envelope by utilizing a pair of total pressure probes discretely and judiciously mounted in the engine. As for example, actual test results have shown that this invention when mounted in the high compression section of the F-100 engine manufactured by the Pratt and Whitney Aircraft Division of United Technologies Corporation surge was detected for all conditions encountered in the 3 Hertz range. By selection of a suitable switch, it is possible to adjust the hysteresis such that the opening and closing of the switch responds to different ΔP values, hence, maximizing the close time of the switch. This affords the advantage of providing sufficient time in which a logic sensor, either digital or analogue, can sample the detectors so as to give a positive output signal upon an acceptable sample. In this manner, unwanted or false surge detection is avoided.

SUMMARY OF THE INVENTION

An object of this invention is to provide an improved surge detector for a turbine type power plant.

A still further object of this invention is to provide a surge detector having a pair of back to back mounted total pressure probes judiciously mounted in the compressor section or in close proximity thereto, having the probe's openings mounted substantially parallel to the air stream. An on-off pressure switch is actuated upon reaching a predetermined ΔP threshold value.

A still further object of this invention, is to provide a surge detector that is characterized as being relatively simply to manufacture, to install and assemble, while being reliable.

The foregoing and other objects, features, and advantages of the present invention will become more apparent in the light of the following detailed description of preferred embodiments thereof as illustrated in the accompanying drawing.

DESCRIPTION OF THE PREFERRED EMBODIMENT

While this invention is shown as being utilized in a particular location for a particular engine as one skilled in the art would appreciate such location for any given engine may be selected not only for convenience but also for that location where it would be most efficacious for a given aircraft operating envelope. In this instance, it was convenient to locate the detector in a boroscope inspection hole already provided.

Figure 1:
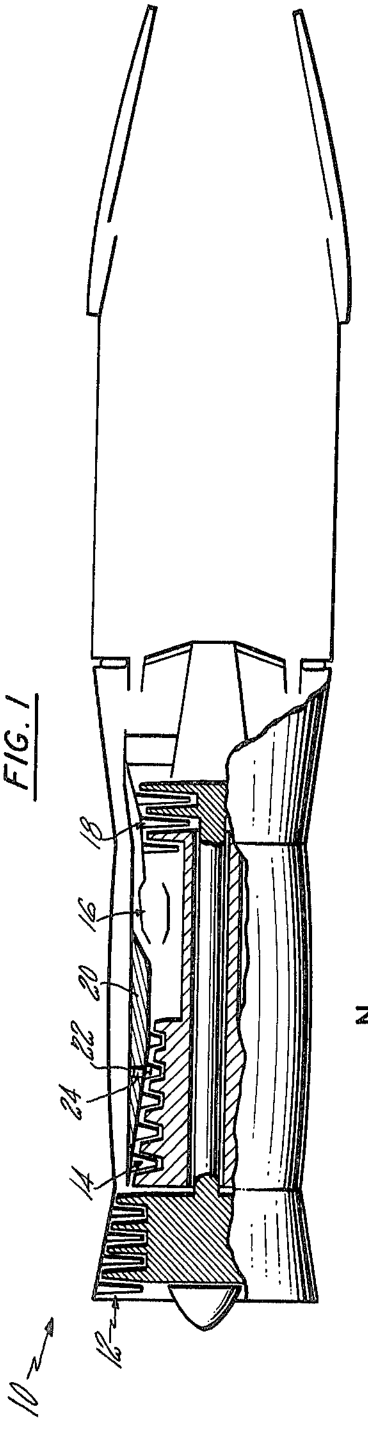
FIG. 1 is a schematic, partly in section, showing the invention in a turbine type power plant.

Reference is now made to FIG. 1 showing a typical multi-spool axial-flow turbo fan engine generally illustrated by reference numeral 10, having a fan section 12, a high compressor section 14, burner section 16 and high and low turbine section 18, driving the high compressor and fan, respectively. In this particular engine configuration, splitter 20 divides the fan exhaust flow, whence a portion by-passes the high compressor and the remaining portion feeds the high compressor. This particular engine at this location includes boroscope inspection hole 22 which is ideally located to receive the detector portion 24. The details of detector 24 are best seen by referring to FIGS. 2 and 3.

Figure 2:
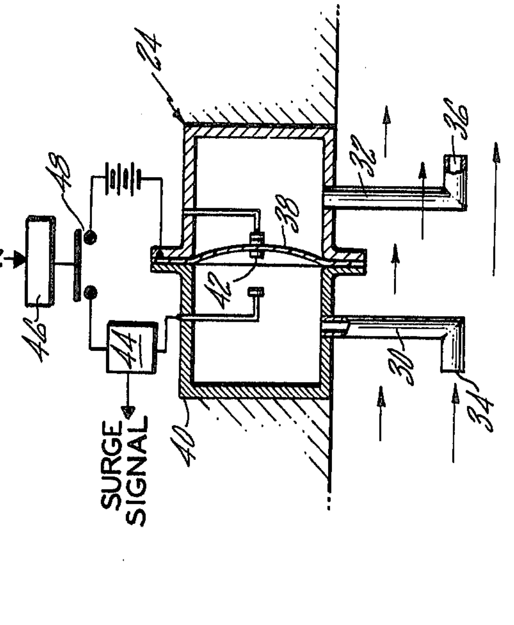
FIG. 2 is a schematic illustration of the invention in the non-surge or normal engine operation in the surge condition.
Figure 3:
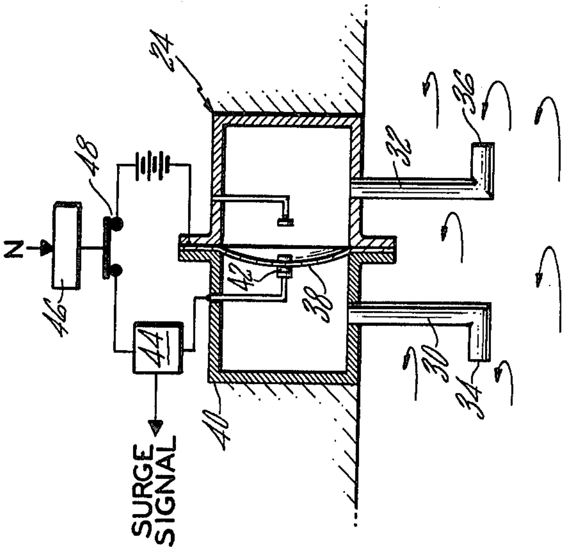
FIG. 3 is a schematic illustration of the invention in the surge condition.

As can be seen from FIGS. 2 and 3, the total pressure pitot tubes 30 and 32 of detector 24 extend through the case into the airstream with the opening 34 of pitot tube 30 facing the airstream and opening 36 of pitot tube 32 facing the opposite direction. The pressure sensed by each pitot tube is applied to the opposite faces of diaphragm 38 suitably supported in casing 40.

It is apparent from the foregoing, that diaphragm 38 senses the differential of the total pressure of the airstream and the static pressure (with negligible aspiration effects). Under normal engine operation this value is at a positive value, say above 1.0 pound per square inch differential (PSID). However, should a surge occur, the flow stream becomes disturbed as shown by the arrows causing the pressure differential to decrease in value. Hence by selecting a threshold value of say 0.5 PSID, the diaphragm 38 will snap over to the opposite side causing the contact 42 carried thereon to close the circuit and relay a surge detected signal as represented by box 44. The diaphragm 38 has a built in hysteresis so that it won't switch over to open the contact until the value of the PSID is higher than the closing value, say 0.9 PSID. Another method of obtaining hysteresis is to make pitot tube 32 longer than pitot tube 30. This hysteresis serves to delay the length of time in which the contact stays closed and hence optimizes the signal as being a time indication of surge. To assure that surge is actually occurring and actuation of the switch wasn't caused by a false surge detection, it may be desirable to sample these closures and not take corrective action until more than one detection occurred within a given space of time. A suitable commercially available switch having the hysteresis capabilities is the 12000 series miniature pressure switch manufactured by the Hydra-Electric Company.

Obviously, upon engine start-up, the PSID will be below the normal operating value. To avoid inadvertent actuation of the surge detector, a suitable lockout indicated by the box 46 will open the surge detection circuit and render the surge detector inoperative during this regime of operation. Lockout 46 responds to speed of the compressor and closes switch 48 when the value of the compressor speed exceeds a predetermined value.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of our invention, that which we claim as new and desire to secure by Letters Patent of the U.S. is:

1. Apparatus for detecting incipient surge in a gas turbine type power plant having an axial flow compressor comprising a pair of back-to-back disposed pitot tubes extending in the working medium of the gas turbine power plant, each of said pitot tubes oriented so that each of its openings is disposed substantially parallel to the flow of the working medium, means for sensing the pressure differential created by said pair of pitot tubes and means responsive to a predetermined threshold value of said pressure differential below which a signal is produced indicative of an incipient surge in said compressor.

2. Apparatus as in claim 1 including a diaphragm having one face subjected to total pressure generated by one of said pair of pitot tubes and the other surface subjected to static pressure from the other of said pitot tubes.

3. Apparatus as in claim 2 wherein said pitot tubes are disposed in the compressor section of said gas turbine power plant.

4. Apparatus as in claim 1 including lockout means normally actuated to render said detector inoperative during periods of operation of said power plant whenever the value of said pressure differential is reached in a condition whence surge would not be present and means responsive to said condition to place said lockout means in an ineffectual condition.

5. Apparatus as in claim 1 including means responsive to compressor speed for rendering said lockout means ineffectual above a predetermined compressor speed value.

6. Apparatus as in claim 2 including hysteresis means for having said diaphragm switch at a given value in one direction and switch in the other direction at a different value.

7. Apparatus as in claim 6 including an electrical circuit including said diaphragm, contact means on said diaphragm for closing said circuit upon being switched in the surge detection condition.

* * * * *